United States Patent
Xu et al.

(10) Patent No.: US 12,496,707 B2
(45) Date of Patent: Dec. 16, 2025

(54) MOTOR WITH TWO DEGREES OF FREEDOM AND ROBOT

(71) Applicant: XIAMEN TUNGSTEN CO., LTD., Fujian (CN)

(72) Inventors: Xiaojing Xu, Xiamen (CN); Fengbin Cai, Xiamen (CN); Zhibin Chen, Xiamen (CN); Xiaoyan Peng, Xiamen (CN); Kanghua Yuan, Xiamen (CN); Qisheng Sun, Xiamen (CN)

(73) Assignee: XIAMEN TUNGSTEN CO., LTD., Xiamen (CN)

( * ) Notice: Subject to any disclaimer, the term of this patent is extended or adjusted under 35 U.S.C. 154(b) by 122 days.

(21) Appl. No.: 18/575,235

(22) PCT Filed: Dec. 13, 2022

(86) PCT No.: PCT/CN2022/138767
§ 371 (c)(1),
(2) Date: Dec. 28, 2023

(87) PCT Pub. No.: WO2024/124407
PCT Pub. Date: Jun. 20, 2024

(65) Prior Publication Data
US 2025/0073893 A1 Mar. 6, 2025

(51) Int. Cl.
*B25J 9/12* (2006.01)
*B25J 17/02* (2006.01)
(Continued)

(52) U.S. Cl.
CPC ............ *B25J 9/126* (2013.01); *B25J 17/0258* (2013.01); *H02K 5/1737* (2013.01); *H02K 21/22* (2013.01)

(58) Field of Classification Search
CPC ........ H02K 21/22; H02K 5/1737; B25J 9/126; B25J 17/0258
(Continued)

(56) References Cited

U.S. PATENT DOCUMENTS

| 2013/0193782 A1 | 8/2013 | Kusase et al. |
| 2017/0070106 A1 | 3/2017 | Guo et al. |

FOREIGN PATENT DOCUMENTS

| CN | 101924438 A | 12/2010 |
| CN | 203278577 U | 11/2013 |

(Continued)

OTHER PUBLICATIONS

EU Search Report dated Sep. 30, 2024 for application No. 22947073.7.

(Continued)

*Primary Examiner* — T. Scott Fix
(74) *Attorney, Agent, or Firm* — Maschoff Brennan (57) ABSTRACT

The present application relates to the technical field of motors, and provides a motor with two degrees of freedom and a robot. Such a motor with two degrees of freedom comprises a motor shell, an outer rotor motor and a disk-type motor, wherein the outer rotor motor comprises an outer-rotor-motor stator assembly and an outer rotor disk, the outer-rotor-motor stator assembly is fixed to the motor shell and arranged circumferentially around the motor shell, and the outer rotor disk serves as a power output end of a first degree of freedom; the disk-type motor is sleeved on the outer rotor motor, and comprises an inner rotor disk and a disk-type-motor stator assembly, the disk-type-motor stator assembly is fixed at a central part of the motor shell, and the inner rotor disk serves as a power output end of a second degree of freedom.

8 Claims, 8 Drawing Sheets

(51) Int. Cl.
*H02K 5/173* (2006.01)
*H02K 21/22* (2006.01)

(58) Field of Classification Search
USPC ........................................................ 74/490.03
See application file for complete search history.

(56) References Cited

FOREIGN PATENT DOCUMENTS

| | | |
|---|---|---|
| CN | 203596719 U | 5/2014 |
| CN | 106505812 A | 3/2017 |
| CN | 106787536 A | 5/2017 |
| CN | 108321979 A | 7/2018 |
| CN | 110336407 A | 10/2019 |
| CN | 213846495 U | 7/2021 |
| CN | 215580843 U | 1/2022 |
| JP | 2013-126334 A | 6/2013 |

OTHER PUBLICATIONS

International Search Report dated Aug. 14, 2023 in application No. PCT/CN2022/138767.
Written Opinion dated Aug. 14, 2023 in application No. PCT/CN2022/138767.

MOTOR WITH TWO DEGREES OF FREEDOM AND ROBOT

TECHNICAL FIELD

The present application relates to the technical field of motors, in particular relates to a motor with two degrees of freedom and a robot.

BACKGROUND

With the progress of science and technology, application of robots is growing increasingly widespread, the robots can assist or replace human beings to engage in some heavy or dangerous work. Thus, the application of robots is of great significance to industrial manufacturing and scientific research. Wherein, a legged robot has a leg-part structure which can automatically change its shape according to different terrains, the legged robot thereby has strong terrain adaptability, it can walk on a complicated road surface and can even accomplish complex motions, such as, running, climbing stairs, and jumping. It has a high degree of automation and is widely used in home service, transportation, inspection, and other fields.

A leg-part structure of a legged robot in the prior art includes a thigh portion and shank portion, in which, the thigh portion and the shank portion are respectively driven by two coaxial motors, wherein one of the coaxial motors controls swing of the thigh and the other one controls that of the shank. Such a leg-part structure, however, has a relatively large axial volume due to the two motors being in serial connection and occupies a relatively large arrangement space, which causes the leg-part structure to be not compact.

SUMMARY

Therefore, a purpose of the present application is to provide a motor with two degrees of freedom and a robot, which have characteristics of compact axial structure and small occupied arrangement space, and can thereby overcome the defects that the leg drive structure of the legged robot in the prior art is not compact and occupies a relatively large arrangement space.

For this purpose, the present application provides a motor with two degrees of freedom that comprises:
  a motor shell;
  an outer rotor motor, comprising an outer-rotor-motor stator assembly and an outer rotor disk, wherein the outer-rotor-motor stator assembly is fixed to the motor shell and arranged around a periphery of the motor shell, and the outer rotor disk serves as a power output end of a first degree of freedom;
  a disk-type motor, sleeved in the outer rotor motor and comprising a disk-type-motor stator assembly and an inner rotor disk, wherein the disk-type-motor stator assembly is fixed at a central part of the motor shell, and the inner rotor disk serves as a power output end of a second degree of freedom.

As a preferred technical solution of the motor with two degrees of freedom, the outer rotor disk and the inner rotor disk are coaxially arranged.

As a preferred technical solution of the motor with two degrees of freedom, end surfaces of the outer rotor disk and the inner rotor disk away from the motor shell are aligned with each other.

As a preferred technical solution of the motor with two degrees of freedom, the motor shell comprises a bottom plate, and a motor-shell cylindrical side plate is formed to be protruding from one side of the bottom plate, and a central column is formed on a central part of the bottom plate;
  an outer-rotor-disk bearing assembly is arranged between the outer rotor disk and the motor-shell cylindrical side plate, and an inner-rotor-disk bearing assembly is arranged between the inner rotor disk and the central column.

As a preferred technical solution of the motor with two degrees of freedom, the outer rotor disk has an outer-rotor-disk cylindrical side plate protruding towards the bottom plate; the inner rotor disk has an inner-rotor-disk cylindrical side plate protruding towards the bottom plate;
  the outer-rotor-disk bearing assembly comprises at least one first bearing and at least one first-bearing positioning element for axially positioning the first bearing, wherein the first bearing is sleeved on the outer-rotor-disk cylindrical side plate and is positioned between the outer-rotor-disk cylindrical side plate and the motor-shell cylindrical side plate, and the first-bearing positioning element is connected to the outer-rotor-disk cylindrical side plate or the motor-shell cylindrical side plate;
  the inner-rotor-disk bearing assembly comprises at least one second bearing and at least one second-bearing positioning element for axially positioning the second bearing, wherein the second bearing is sleeved on the central column and is positioned between the inner-rotor-disk cylindrical side plate and the central column, and the second-bearing positioning element is connected to the central column.

As a preferred technical solution of the motor with two degrees of freedom, the outer-rotor-disk bearing assembly comprises two first bearings and two first-bearing positioning elements, and the two first bearings are arranged adjacent to each other and abutted axially between the two first-bearing positioning elements, wherein one of the two first-bearing positioning elements is connected with an end of the motor-shell cylindrical side plate away from the bottom plate, and the other of the two first-bearing positioning element is fitted onto an outer wall of the outer-rotor-disk cylindrical side plate at an end thereof adjacent to the bottom plate;
  the inner-rotor-disk bearing assembly comprises two second bearings and two second-bearing positioning elements, the two second bearings are respectively arranged at one end of the central column away from the bottom plate and an opposite end thereof adjacent to the bottom plate, wherein one of the two second-bearing positioning elements is connected with an end of the central column away from the bottom plate and axially abuts against one of the two second bearings that is arranged at the end of the central column away from the bottom plate, and the other of the two second-bearing positioning elements is connected to an outer wall of the central column at an end thereof adjacent to the bottom plate and axially abuts against the other of the two second bearings that is arranged at the end of the central column adjacent to the bottom plate.

As a preferred technical solution of the motor with two degrees of freedom, a bearing gasket fitted onto the motor-shell cylindrical side plate is provided between the two first bearings; a bearing positioning ring fitted onto the central column is provided between the two second bearings.

As a preferred technical solution of the motor with two degrees of freedom, the outer-rotor-motor stator assembly is fixedly connected to the motor-shell cylindrical side plate, and the outer rotor disk has an outer-rotor-motor side wall protruding towards the bottom plate, wherein an inner side surface of the outer-rotor-motor side wall is provided with an outer-rotor-motor magnet steel that is arranged to face the outer-rotor-motor stator assembly;

the disk-type-motor stator assembly is fixedly connected to the bottom plate, and an inner side surface of the inner rotor disk facing the bottom plate is provided with a disk-type-motor magnet steel that is arranged to face the disk-type-motor stator assembly.

As a preferred technical solution of the motor with two degrees of freedom, the outer rotor motor and the disk-type motor are both low-speed high-torque motors.

A robot is also provided and comprises a thigh, a shank, and the aforesaid motor with two degrees of freedom, wherein the outer rotor disk of the motor with two degrees of freedom is connected to an upper end of the thigh and configured to drive the thigh to swing, and the inner rotor disk of the motor with two degrees of freedom is connected to the shank through a synchronous belt and configured to drive the shank to swing.

The technical solution of the present application has the following advantages:

(1) The motor with two degrees of freedom provided by the present application comprises the motor shell, the outer rotor motor and the disk-type motor, wherein the outer rotor motor comprises the outer-rotor-motor stator assembly and the outer rotor disk which serves as the power output end of a first degree of freedom, and the disk-type motor is arranged inside the outer rotor motor and comprises the disk-type-motor stator assembly and the inner rotor disk which serves as the power output end of a second degree of freedom. The motor with two degrees of freedom of the present application has power output ends of two degrees of freedom, including the power output end of a first degree of freedom and the power output end of a second degree of freedom, and both the power output end of the first degree of freedom and the power output end of the second degree of freedom work individually and do not interfere with each other. And, of course, it is also available to use only one of the power output ends corresponding to one of the degrees of freedom according to a situation of application. The disk-type motor is arranged inside the outer rotor motor, making an overall structure compact in reasonableness and occupying a small arrangement space, so as to be suitable for a scenario of application where an axial space is limited, and such a motor with two degrees of freedom can realize a characteristic of outputting low-speed high-torque with two degrees of freedom, thereby being suitable for a scenario of application that requires coaxial torque output with two degrees of freedom within a limited axial space.

(2) In the motor with two degrees of freedom provided by the present application, the outer rotor disk and the inner rotor disk thereof are coaxially arranged, which can facilitate a structural arrangement of the outer rotor motor and the disk-type motor, so as to be able to make the overall structure of the motor more compact and reasonable, and is suitable for a scenario of application that requires coaxial torque output with two degrees of freedom within a limited axial space.

(3) In the motor with two degrees of freedom provided by the present application, end surfaces of the outer rotor disk and the inner rotor disk away from the motor shell are aligned with each other, making an axial dimension of the motor with two degrees of freedom small and making a structure of the motor more compact, so as to occupy a small axial space.

(4) In the motor with two degrees of freedom provided by the present application, the outer-rotor-disk bearing assembly is arranged between the outer rotor disk and the motor-shell cylindrical side plate, and the inner-rotor-disk bearing assembly is arranged between the inner rotor disk and the central column. By arranging the outer-rotor-disk bearing assembly and the inner-rotor-disk bearing assembly, the rotational motions of the outer rotor disk and the inner rotor disk can be made smoother.

(5) The robot provided by the present application comprises a thigh, a shank and the motor with two degrees of freedom provided by the present application, wherein the motor with two degrees of freedom can drive the thigh and the shank to swing simultaneously, and actions of the thigh and the shank do not affect each other, and a structure thereof is compact, resulting in a small space occupation, thereby an axial space of a leg-part drive structure of the robot can be significantly reduced, which is beneficial for a miniaturization design of the robot.

BRIEF DESCRIPTION OF DRAWINGS

In order to explain technical solutions in specific embodiments of the present application or in the prior art more clearly, drawings that need to be used in the description of the specific embodiments or the prior art will be briefly introduced below. Apparently, the drawings described below only represent some embodiments of the present application, and other drawings can be obtained from these drawings without any creative effort by a person skilled in the art.

DESCRIPTION OF REFERENCE NUMERALS

1, motor shell; 101, bottom plate; 102, motor-shell cylindrical side plate; 103, central column;
201, outer-rotor-motor stator assembly; 202, outer rotor disk; 2021, outer-rotor-disk cylindrical side plate;

2022, outer-rotor-disk side wall; 2023, first assembly hole; 203. outer-rotor-motor magnet steel;

301, disk-type-motor stator assembly; 302, inner rotor disk; 3021, inner-rotor-disk cylindrical side plate; 3022, second assembly hole; 303, disk-type-motor magnet steel;

401, first bearing; 402, first-bearing positioning element; 403, bearing gasket;

501, second bearing; 502, second-bearing positioning element; 503, bearing positioning ring;

6, thigh; 7, shank; 8, synchronous belt; 9, synchronous pulley.

DETAILED DESCRIPTION OF SPECIFIC EMBODIMENTS

A clear and complete description of technical solutions of the present application is given below in conjunction with the accompanying drawings, and it is apparent that the described embodiments only represent part of and not all of embodiments of the present application. Based on the embodiments described in the present application, all other embodiments obtainable by a person skill in the art without making creative efforts fall within the scope of protection of the present application.

In the description of the present application, it should be noted that the terms "center", "up", "down", "left", "right", "vertical", "horizontal", "inside", "outside", etc. denote directions or positional relations based on those shown in the drawings, are intended for convenience and simplification of the description only, and are not intended to indicate or imply that the mentioned device or element must have a particular direction or must be constructed and operated in a particular orientation, and therefore such terms cannot be construed as limiting the present application. Furthermore, the terms "first", "second" and "third" are only used for descriptive purposes and cannot be understood to indicate or imply relative importance.

In the description of the present application, it should be noted that, unless otherwise expressly specified and defined, the terms "mounted", "connected with", and "connected to" are understood in a broad sense, for example, they may indicate fixed connection, detachable connection, or integral connection; they may also indicate mechanical connection or electrical connection; and they may also indicate direct connection or indirect connection through an intermediate medium, and they may also indicate internal communication of two elements. To those of ordinary skill in the art, the specific meanings of the above terms in the present application can be understood according to specific circumstances.

Furthermore, the technical features involved in various embodiments of the present application described below may be combined with each other as long as they do not conflict with each other.

Figure 1:
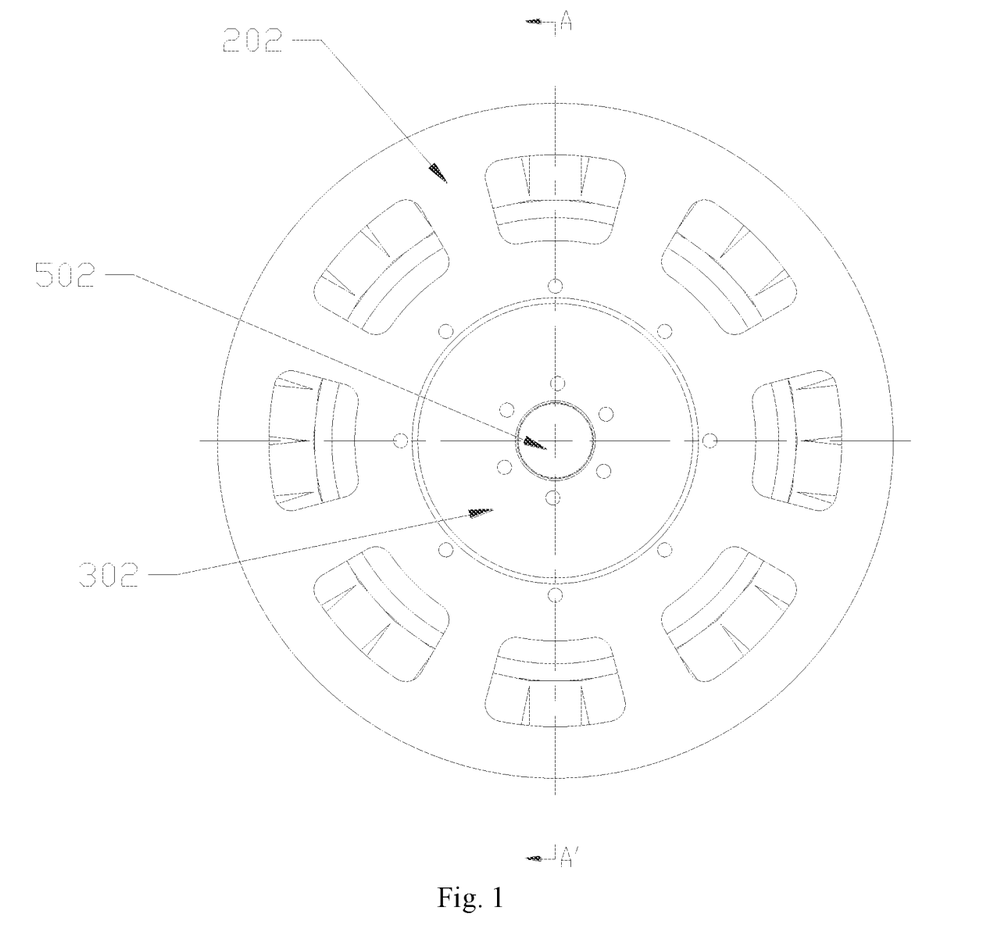
FIG. 1 is a schematic diagram of the motor with two degrees of freedom of an embodiment of the present application.
Figure 2:
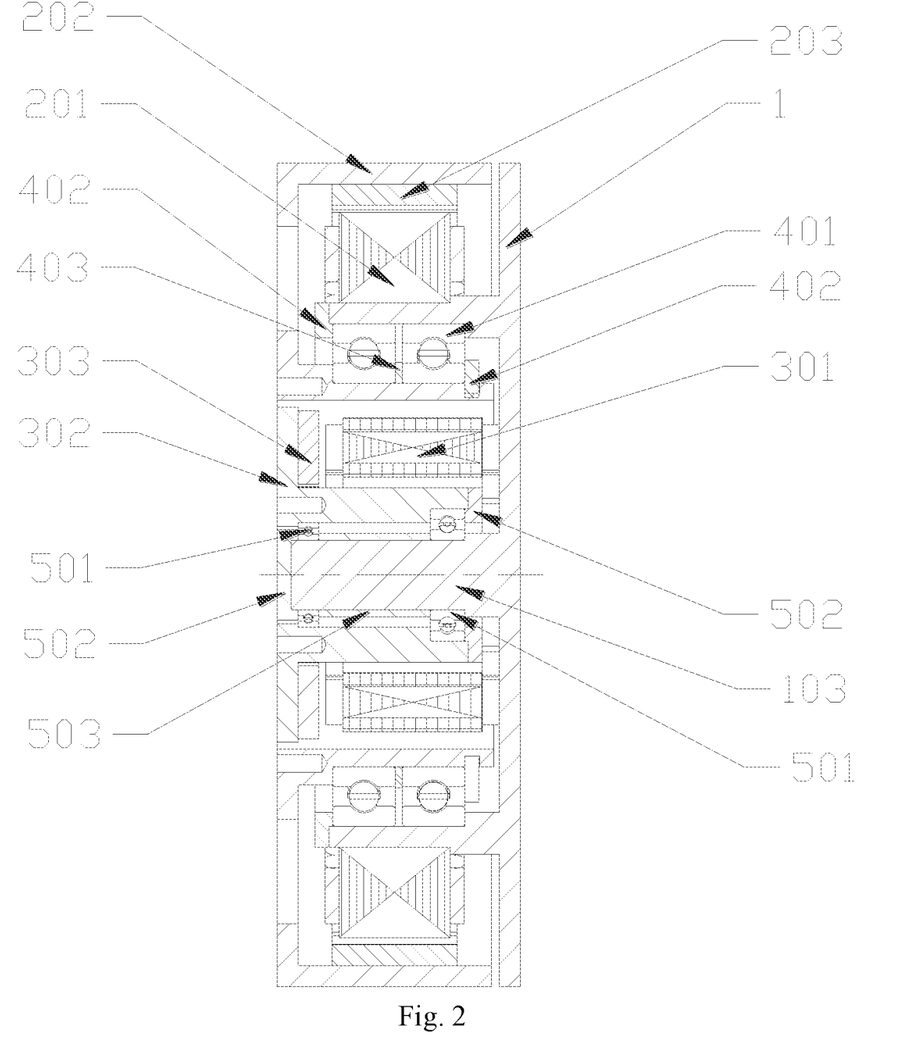
FIG. 2 is a sectional view in the A-A' direction of the embodiment of the present application in FIG. 1.

As shown in FIGS. 1 and 2, a preferred embodiment of the motor with two degrees of freedom in the present application is shown. The motor with two degrees of freedom has power output ends of two degrees of freedom, the power output ends of two degrees of freedom can work individually and do not interfere with each other, wherein two motors corresponding to the two degrees of freedom can simultaneously drive two actuators to move without interfering with each other, thereby making an overall structure thereof compact and occupying a small arrangement space, which is suitable for a scenario of application that requires coaxial torque output with two degrees of freedom within a limited axial space.

The motor with two degrees of freedom includes a motor shell 1, an outer rotor motor, and a disk-type motor.

Figure 3:
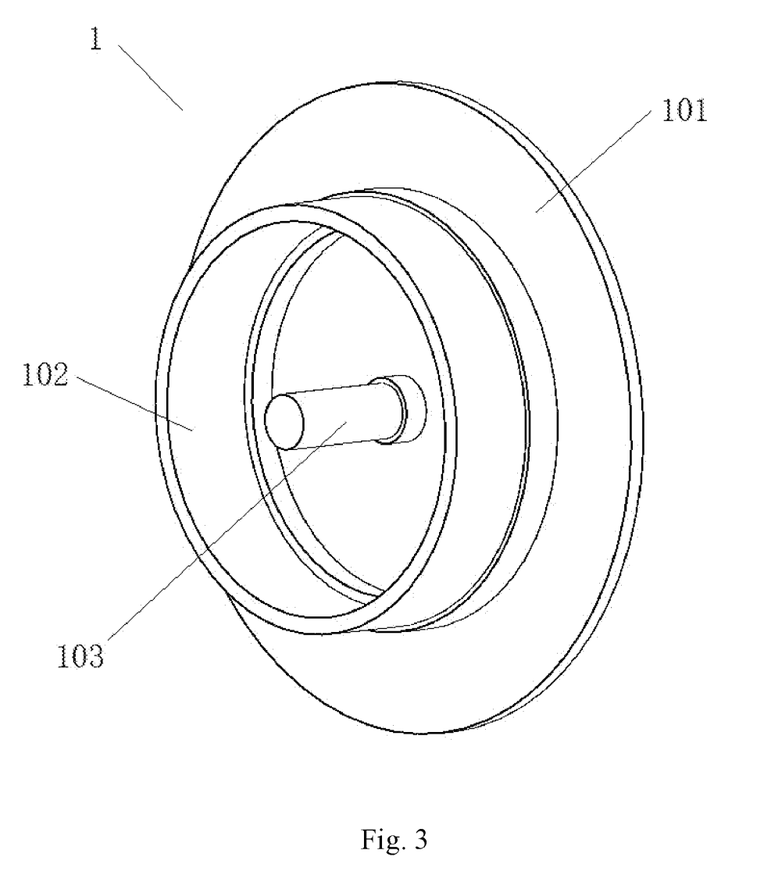
FIG. 3 is a schematic diagram of a motor shell in the motor with two degrees of freedom of an embodiment of the present application.

As shown in FIG. 3, the motor shell 1 is a carrier of the motor with two degrees of freedom. Optionally, the motor shell 1 includes a bottom plate 101, and in this embodiment, the bottom plate 101 is a circular plate-like structure, wherein a protruding motor-shell cylindrical side plate 102 is formed on one side of the bottom plate 101, and in order to make a convenient structural arrangement, the motor-shell cylindrical side plate 102 is a cylindrical structure, wherein a diameter of the motor-shell cylindrical side plate 102 is smaller than that of the bottom plate 101, and there is a central column 103 formed on a central part of the bottom plate 101, and wherein the central column 103 is arranged inside the motor-shell cylindrical side plate 102. In this embodiment, the bottom plate 101, the motor-shell cylindrical side plate 102 and the central column 103 are coaxially arranged, and an axial height of the central column 103 is greater than an axial height of the motor-shell cylindrical side plate 102 in order to cooperate with other structures.

The outer rotor motor includes an outer-rotor-motor stator assembly 201 fixed to the motor shell 1 and arranged around a periphery of the motor shell 1, and an outer rotor disk 202 which serves as a power output end of a first degree of freedom. In this embodiment, the outer-rotor-motor stator assembly 201 is fixedly connected to the motor-shell cylindrical side plate 102, optionally, the outer-rotor-motor stator assembly 201 is fixedly connected to an outer wall of the motor-shell cylindrical side plate 102, and the outer-rotor-motor stator assembly 201 is disposed circumferentially around the outer wall of the motor-shell cylindrical side plate 102. Optionally, the outer rotor motor of this embodiment adopts a low-speed high-torque motor, and the outer rotor disk 202 is the power output end of a first degree of freedom, which can drive an actuator to move.

Figure 4:
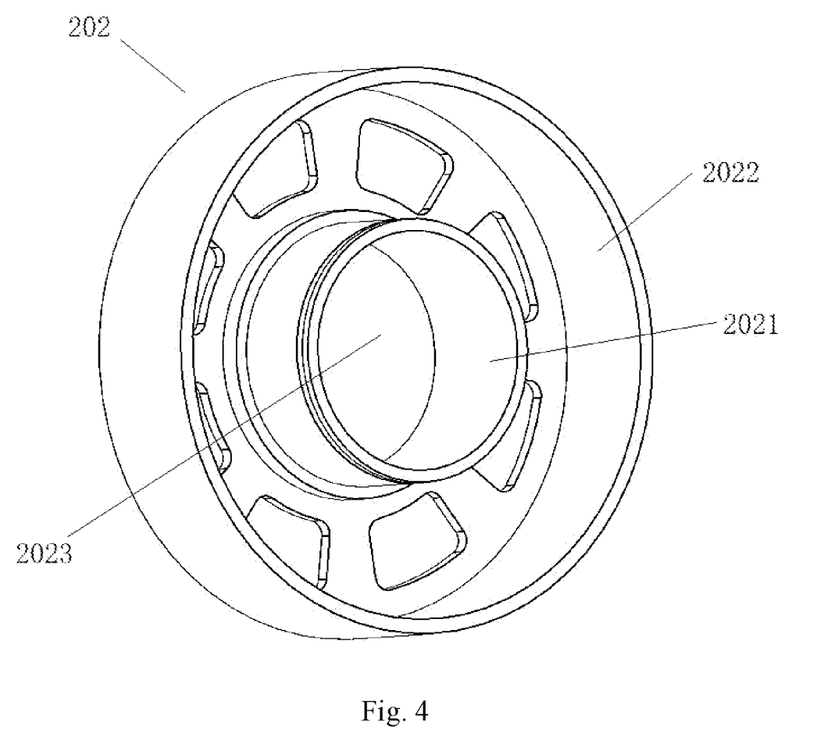
FIG. 4 is a schematic diagram of an outer rotor disk in the motor with two degrees of freedom of an embodiment of the present application.

As shown in FIG. 4, the outer rotor disk 202 has a circular cover-like structure as a whole, and a first assembly hole 2023 is formed in a central part of the outer rotor disk 202 for providing a disk-type motor and the like therein. The outer rotor disk 202 has an outer-rotor-disk side wall 2022 protruding towards the bottom plate 101, wherein an inner side surface of the outer-rotor-disk side wall 2022 is provided with an outer-rotor-motor magnet steel 203 that is arranged to face the outer-rotor-motor stator assembly 201. Optionally, the outer-rotor-motor magnet steel 203 is distributed in a circle in a circumferential direction of the inner side surface of the outer-rotor-disk side wall 2022. Moreover, the outer rotor disk 202 further has an outer-rotor-disk cylindrical side plate 2021 protruding towards the bottom plate 101, and the outer-rotor-disk cylindrical side plate 2021 is arranged around the first assembly hole 2023, wherein the outer-rotor-disk cylindrical side plate 2021 has a cylindrical structure and has a diameter smaller than that of the outer rotor disk 202, and in this embodiment, the outer rotor disk 202, the outer-rotor-disk cylindrical side plate 2021, the outer-rotor-disk side wall 2022, and the first assembly hole 2023 are coaxially arranged.

The disk-type motor is nested inside the outer rotor motor, and optionally, the disk-type motor is arranged in a space enclosed by the outer-rotor-disk cylindrical side plate 2021, making a sufficient usage of an internal space available of the outer rotor motor and forming a compact structure of motor. The disk-type motor comprises a disk-type-motor stator assembly 301 and an inner rotor disk 302, wherein the disk-type-motor stator assembly 301 is fixed at a central part of the motor shell 1, and the inner rotor disk 302 serves as a power output end of a second degree of freedom. In the present embodiment, the disk-type-motor stator assembly 301 is fixedly connected to the bottom plate 101, and optionally the disk-type-motor stator assembly 301 is arranged annularly on the bottom plate 101. Optionally, the disk motor of this embodiment is a low-speed high-torque motor, and the inner rotor disk 302 serves as the power output end of a second degree of freedom, which can drive an actuator to move.

The power output end of a first degree of freedom and the power output end of a second degree of freedom can respectively drive an actuator to move, that is, the motor with two degrees of freedom of the present application can simultaneously drive two actuators to work separately without interfering with each other, and of course, only one of the power output ends corresponding to one of the degrees of freedom (the power output end of the first degree of freedom or the power output end of the second degree of freedom) may be used to drive an actuator to move according to a situation of application. Furthermore, since each of the outer rotor motor and the disk-type motor of this embodiment adopts a low-speed high-torque motor, each of the two power output ends corresponding to the two degrees of freedom for the motor with two degrees of freedom thus has a characteristic of low-speed high-torque.

Figure 5A:
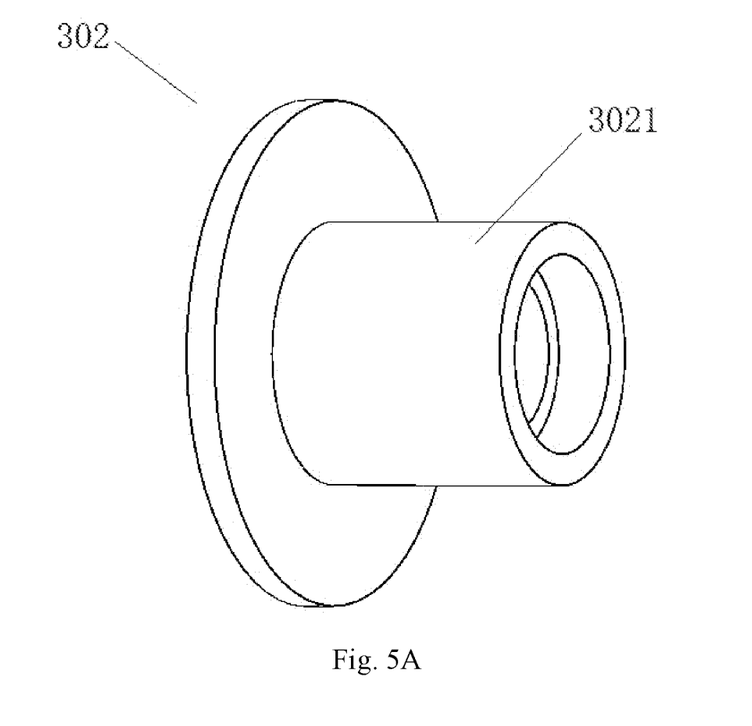
FIG. 5A is a schematic diagram of an inner rotor disk in the motor with two degrees of freedom of an embodiment of the present application.
Figure 5B:
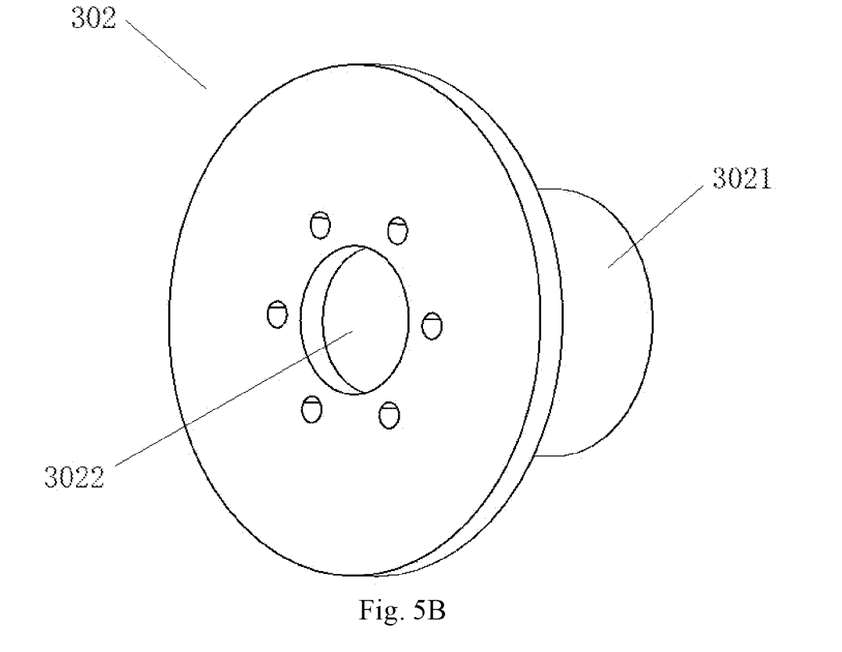
FIG. 5B is a schematic diagram at another angle of the inner rotor disk in the motor with two degrees of freedom of an embodiment of the present application.

As shown in FIG. 5A and FIG. 5B, the inner rotor disk 302 has a circular cover-like structure as a whole, and a second assembly hole 3022 is formed in a central part of the outer rotor disk 302 for providing other structures therein. The inner rotor disk 302 has an inner-rotor-disk cylindrical side plate 3021 protruding towards the bottom plate 101, wherein the inner-rotor-disk cylindrical side plate 3021 has a cylindrical structure and a diameter smaller than that of the inner rotor disk 302, and in this embodiment, the inner rotor disk 302, the inner-rotor-disk cylindrical side plate 3021, and the second assembly hole 3022 are coaxially arranged. In addition, an inner side surface of the inner rotor disk 302 facing the bottom plate 101 is provided with a disk-type-motor magnet steel 303 that is arranged to face the disk-type-motor stator assembly 301. Optionally, the disk-type-motor magnet steel 303 is arranged outside the inner-rotor-disk cylindrical side plate 3021 and distributed in a circle in a circumferential direction thereof.

Optionally, the outer rotor disk 202 and the inner rotor disk 302 are coaxially arranged, and end surfaces of the outer rotor disk 202 and the inner rotor disk 302 away from the motor shell 1 are aligned with each other to facilitate a structural arrangement and reduce an axial size of the motor, thereby saving arrangement space.

Optionally, an outer-rotor-disk bearing assembly is arranged between the outer rotor disk 202 and the motor-shell cylindrical side plate 102, and an inner-rotor-disk bearing assembly is arranged between the inner rotor disk 302 and the central column 103, wherein the outer rotor disk 202 and the inner rotor disk 302 are both rotatable relative to the motor shell 1.

Optionally, the outer-rotor-disk bearing assembly comprises at least one first bearing 401 and at least one first-bearing positioning element 402 for axially positioning the first bearing 401, wherein the first bearing 401 is sleeved on the outer-rotor-disk cylindrical side plate 2021 and is positioned between the outer-rotor-disk cylindrical side plate 2021 and the motor-shell cylindrical side plate 102, and the first-bearing positioning element 402 is connected to the outer-rotor-disk cylindrical side plate 2021 or the motor-shell cylindrical side plate 102. The inner-rotor-disk bearing assembly comprises at least one second bearing 501 and at least one second-bearing positioning element 502 for axially positioning the second bearing 501, wherein the second bearing 501 is sleeved on the central column 103 and is positioned between the inner-rotor-disk cylindrical side plate 3021 and the central column 103, and the second-bearing positioning element 502 is connected to the central column 103.

In this embodiment, the outer-rotor-disk bearing assembly comprises two first bearings 401 and two first-bearing positioning elements 402, and the two first bearings 401 are arranged adjacent to each other and abutted axially between the two first-bearing positioning elements 402, wherein one of the two first-bearing positioning elements 402 is connected with an end of the motor-shell cylindrical side plate 102 away from the bottom plate 101, and the other of the two first-bearing positioning element 402 is fitted onto an outer wall of the outer-rotor-disk cylindrical side plate 2021 at an end thereof adjacent to the bottom plate 101. Optionally, the first bearing 401 is preferably a deep-groove ball bearing, and the first-bearing positioning element 402 connected to an end of the motor-shell cylindrical side plate 102 away from the bottom plate 101 is specifically a first bearing pressure cap which is fixedly connected to an end surface of the motor-shell cylindrical side plate 102 away from the bottom plate 101, while the other first-bearing positioning element 402 fitted onto an outer wall of an end of the outer-rotor-disk cylindrical side plate 2021 adjacent to the bottom plate 101 is specifically a bearing retaining ring which is cooperatively clamped onto the outer-rotor-disk cylindrical side plate 2021, wherein the first bearing pressure cap and the bearing retaining ring jointly constrain an axial position of the two first bearings 401 and prevent the first bearings 401 from shifting, thereby ensuring normal operation of the outer rotor motor. It should be noted that, in order to make the structure more compact, a corresponding mounting groove structure is formed on an inner side surface of the motor-shell cylindrical side plate 102 for receiving the two first bearings 401.

Optionally, a bearing gasket 403 sleeved on the motor-shell cylindrical side plate 102 is provided between the two first bearings 401 to prevent the two first bearings 401 from abrasion caused by prolonged contact therebetween.

In this embodiment, the inner-rotor-disk bearing assembly comprises two second bearings 501 and two second-bearing positioning elements 502, the two second bearings 501 are respectively arranged at one end of the central column 103 away from the bottom plate 101 and an opposite end thereof adjacent to the bottom plate 101, wherein one of the two second-bearing positioning elements 502 is connected with an end of the central column 103 away from the bottom plate 101 and axially abuts against one of the two second bearings 501 that is arranged at the end of the central column 103 away from the bottom plate 101, and the other of the two second-bearing positioning elements 502 is connected to an outer wall of the central column 103 at an end thereof adjacent to the bottom plate 101 and axially abuts against the other of the two second bearings 501 that is arranged at the end of the central column 103 adjacent to the bottom plate 101. Optionally, the second bearing 501 is also preferably a deep-groove ball bearing, and the second-bearing positioning element 502 connected to an end of the central column 103 away from the bottom plate 101 is a second bearing pressure cap which is fixedly connected to an end surface of the central column 103 away from the bottom plate 101, and the second bearing pressure cap is arranged in the second assembly hole 3022; and the second-bearing positioning element 502 connected to an outer wall of an end of the central column 103 adjacent to the bottom plate 101 is a third bearing pressure cap which is sleeved on the central column 103 and abuts against an end surface of the inner-rotor-disk cylindrical side plate 3021 so that the axial position of the third bearing pressure cap is limited thereby. It should be noted that, in order to make the structure more compact, a corresponding mounting groove structure is formed on an inner side surface of the inner-rotor-disk cylindrical side plate 3021 for receiving the two second bearings 501. Optionally, a bearing positioning ring 503 sleeved on the central column 103 is provided between the two second bearings 501, and the second bearing pressure cap, the third bearing pressure cap, and the bearing positioning ring 503 together limit an axial position of the two second bearings 501 to prevent the second bearings 501 from shifting, thereby ensuring normal operation of the disk-type motor.

Figure 6:
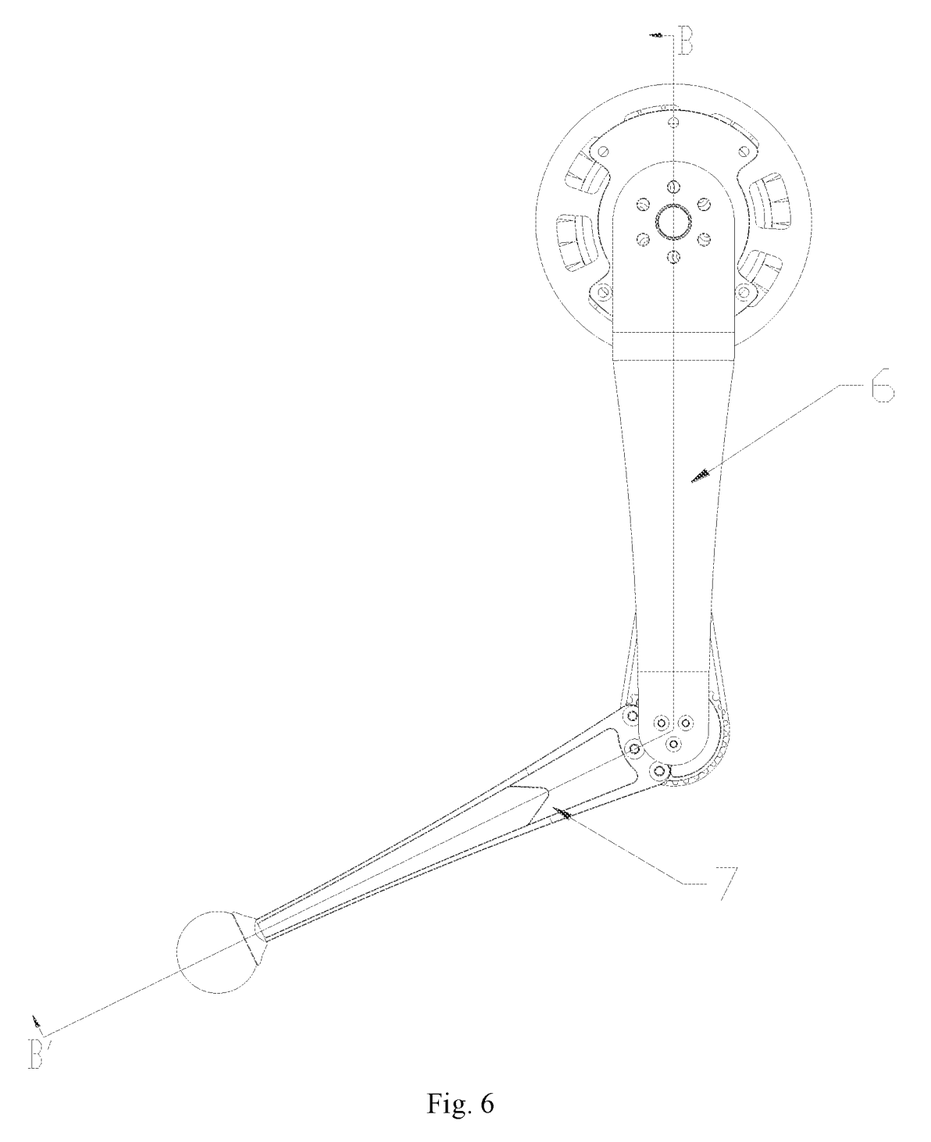
FIG. 6 is a schematic diagram of a leg-part structure of the robot of an embodiment of the present application.
Figure 7:
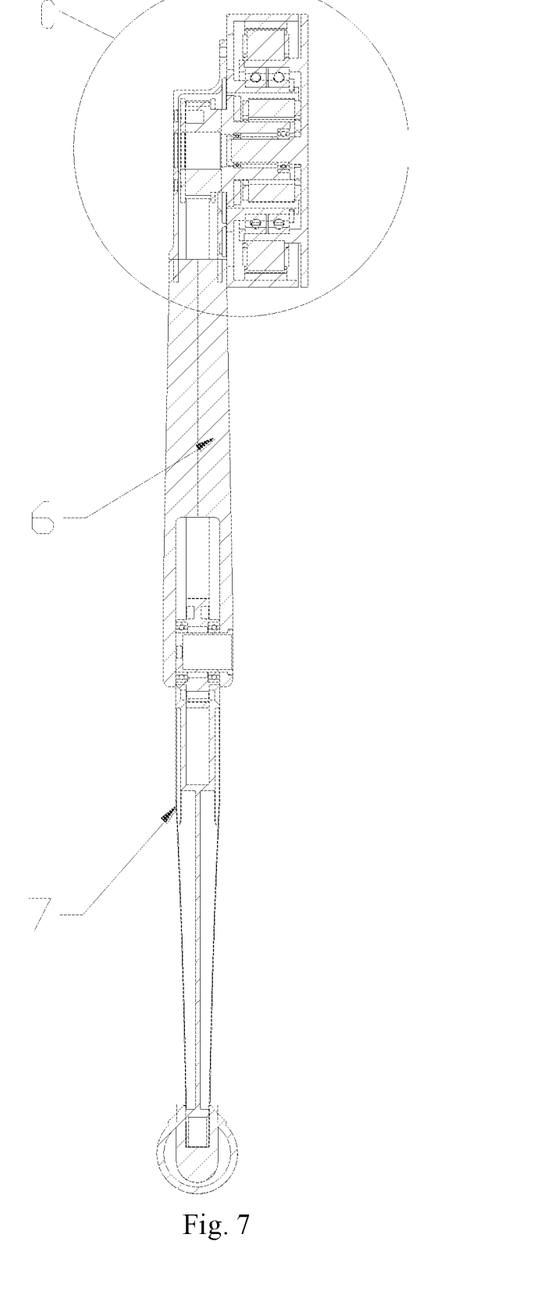
FIG. 7 is a sectional view in the B-B' direction of the embodiment of the present application in FIG. 6.
Figure 8:
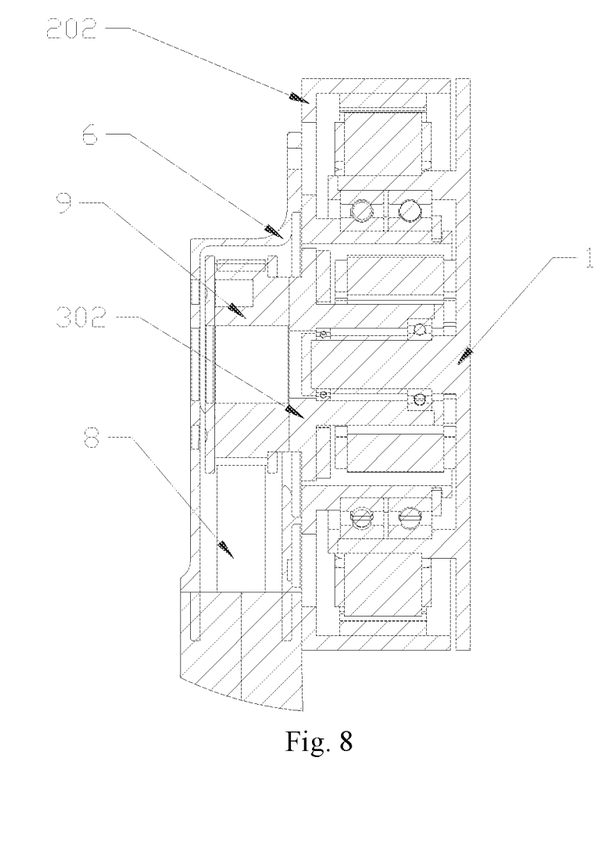
FIG. 8 is an enlarged view of Portion C of the embodiment of the present application in FIG. 7.

As shown in FIG. 6 to FIG. 8, this embodiment also provides a robot, which is a legged robot and comprises a thigh 6, a shank 7, and the motor with two degrees of freedom provided in this embodiment, wherein the outer rotor disk 202 of the motor with two degrees of freedom is connected to an upper end of the thigh 6 and drives the thigh 6 to swing, and the inner rotor disk 302 of the motor with two degrees of freedom is connected to the shank 7 via a synchronous belt 8 and drives the shank 7 to swing. Of course, according to different functional settings and application scenarios, the robot should also include other structures and components that the robots in the prior art have, which are not described in detail because of the absence of involvement in the present application.

Optionally, the motor shell 1 is fixed to an external frame of the robot, and an end surface of the outer rotor disk 202 away from the motor shell 1 is connected to the upper end of the thigh 6, a manner of connection thereof may be by means of a fastener such as a screw bolt, and reciprocating rotation of the outer rotor disk 202 can drive the thigh 6 to swing. An end surface of the inner rotor disk 302 away from the motor shell 1 is connected to a synchronous pulley 9 by means of a fastener such as a screw bolt. Preferably, an end surface of the inner rotor disk 302 away from the motor shell 1 is coaxially connected to the synchronous pulley 9, and a synchronous belt 8 is wound on the synchronous pulley 9, and an end part of the synchronous belt 8 away from the synchronous pulley 9 is connected to the shank 7, and reciprocating rotation of the inner rotor disk 302 can drive the synchronous pulley 9 to rotate in a reciprocating manner, thereby causing the end part of the synchronous belt 8 away from the synchronous pulley 9 to stretch out or retract in, so as to realize a swing of the shank 7.

By configuring the motor with two degrees of freedom to simultaneously drive the thigh and the shank to swing, wherein actions of the thigh and the shank do not affect each other, it is realized that the structure is compact and the occupied space is small, thereby an axial space of a leg-part drive structure of the robot can be significantly reduced, which is beneficial for a miniaturization design of the robot.

In other embodiments, according to different requirements of design, the outer-rotor-disk bearing assembly may include one or three first bearing(s) 401 with one or three first-bearing positioning element(s) 402, which can be implemented by only adjusting the arrangement positions of the first bearing(s) 401 and the first-bearing positioning element(s) 402. Similarly, according to different requirements of design, the inner-rotor-disk bearing assembly may include one or three second bearing(s) 501 and one or more second-bearing positioning element(s) 502, which can be implemented by only adjusting the arrangement positions of the second-bearing(s) 501 and the second-bearing positioning element(s) 502.

Apparently, the aforesaid embodiments are merely examples for making a clear explanation and are not intended to limit the implementing ways. For a person skilled in the art, different forms of changes or modifications can be made based on the aforesaid explanation. It is unnecessary and impossible to list all the implementing ways herein. And any obvious change or modification derived therefrom are still within the scope of protection of the present invention application.

The invention claimed is:

1. A motor with two degrees of freedom, comprising:
   a motor shell;
   an outer rotor motor, comprising an outer-rotor-motor stator assembly and an outer rotor disk, wherein the outer-rotor-motor stator assembly is fixed to the motor shell and arranged around a periphery of the motor shell, and the outer rotor disk serves as a power output end of a first degree of freedom;
   a disk motor, arranged inside the outer rotor motor and comprising a disk-motor stator assembly and an inner rotor disk, wherein the disk-motor stator assembly is fixed at a central part of the motor shell, and the inner rotor disk serves as a power output end of a second degree of freedom;
   wherein the motor shell comprises a bottom plate, and a motor-shell cylindrical side plate is formed to be protruding from one side of the bottom plate, and a central column is formed on a central part of the bottom plate;
   an outer-rotor-disk bearing assembly is arranged between the outer rotor disk and the motor-shell cylindrical side plate, and an inner-rotor-disk bearing assembly is arranged between the inner rotor disk and the central column;
   wherein the outer rotor disk has an outer-rotor-disk cylindrical side plate protruding towards the bottom plate; the inner rotor disk has an inner-rotor-disk cylindrical side plate protruding towards the bottom plate;
   the outer-rotor-disk bearing assembly comprises at least one first bearing and at least one first-bearing positioning element for axially positioning the first bearing, wherein the first bearing is sleeved on the outer-rotor-disk cylindrical side plate and is positioned between the outer-rotor-disk cylindrical side plate and the motor-shell cylindrical side plate, and the first-bearing positioning element is connected to the outer-rotor-disk cylindrical side plate or the motor-shell cylindrical side plate;
   the inner-rotor-disk bearing assembly comprises at least one second bearing and at least one second-bearing positioning element for axially positioning the second bearing, wherein the second bearing is sleeved on the central column and is positioned between the inner-rotor-disk cylindrical side plate and the central column, and the second-bearing positioning element is connected to the central column.

2. The motor with two degrees of freedom according to claim 1, wherein the outer rotor disk and the inner rotor disk are coaxially arranged.

3. The motor with two degrees of freedom according to claim 1, wherein end surfaces of the outer rotor disk and the inner rotor disk away from the motor shell are aligned with each other.

4. The motor with two degrees of freedom according to claim 1, wherein the outer-rotor-disk bearing assembly comprises two first bearings and two first-bearing positioning elements, and the two first bearings are arranged adjacent to each other and abutted axially between the two first-bearing positioning elements, wherein one of the two first-bearing positioning elements is connected with an end of the motor-shell cylindrical side plate away from the bottom plate, and the other of the two first-bearing positioning element is fitted onto an outer wall of the outer-rotor-disk cylindrical side plate at an end thereof adjacent to the bottom plate;

the inner-rotor-disk bearing assembly comprises two second bearings and two second-bearing positioning elements, the two second bearings are respectively arranged at one end of the central column away from the bottom plate and an opposite end thereof adjacent to the bottom plate, wherein one of the two second-bearing positioning elements is connected with an end of the central column away from the bottom plate and axially abuts against one of the two second bearings that is arranged at the end of the central column away from the bottom plate, and the other of the two second-bearing positioning elements is connected to an outer wall of the central column at an end thereof adjacent to the bottom plate and axially abuts against the other of the two second bearings that is arranged at the end of the central column adjacent to the bottom plate.

5. The motor with two degrees of freedom according to claim 4, wherein a bearing gasket fitted onto the motor-shell cylindrical side plate is provided between the two first bearings; a bearing positioning ring fitted onto the central column is provided between the two second bearings.

6. The motor with two degrees of freedom according to claim 1, wherein the outer-rotor-motor stator assembly is fixedly connected to the motor-shell cylindrical side plate, and the outer rotor disk has an outer-rotor-disk side wall protruding towards the bottom plate, wherein an inner side surface of the outer-rotor-disk side wall is provided with an outer-rotor-motor magnet steel that is arranged to face the outer-rotor-motor stator assembly;

the disk-motor stator assembly is fixedly connected to the bottom plate, and an inner side surface of the inner rotor disk facing the bottom plate is provided with a disk-motor magnet steel that is arranged to face the disk-motor stator assembly.

7. The motor with two degrees of freedom according to claim 1, wherein the outer rotor motor and the disk motor are both low-speed high-torque motors.

8. A robot, comprising a thigh, a shank, and the motor with two degrees of freedom according to claim 1, wherein the outer rotor disk of the motor with two degrees of freedom is connected to an upper end of the thigh and configured to drive the thigh to swing, and the inner rotor disk of the motor with two degrees of freedom is connected to the shank through a synchronous belt and configured to drive the shank to swing.

\* \* \* \* \*